US012754746B2

(12) United States Patent
Zheng et al.

(10) Patent No.: US 12,754,746 B2
(45) Date of Patent: Oct. 6, 2026

(54) DATA PROCESSING METHOD, COMPUTER DEVICE, AND STORAGE MEDIUM

(71) Applicant: TENCENT TECHNOLOGY (SHENZHEN) COMPANY LIMITED, Shenzhen (CN)

(72) Inventors: Shucheng Zheng, Shenzhen (CN); Sicheng Huang, Shenzhen (CN); Boquan Fu, Shenzhen (CN); Canhui Huang, Shenzhen (CN); Chaozhong Yu, Shenzhen (CN); Jingchen Zhao, Shenzhen (CN); Shun Li, Shenzhen (CN); Hongqiang Chen, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 563 days.

(21) Appl. No.: 18/358,117

(22) Filed: Jul. 25, 2023

(65) Prior Publication Data

US 2023/0367616 A1 Nov. 16, 2023

Related U.S. Application Data

(63) Continuation of application No. PCT/CN2022/135213, filed on Nov. 30, 2022.

(30) Foreign Application Priority Data

Mar. 1, 2022 (CN) ........................ 202210196506.9

(51) Int. Cl.
*G06F 9/44* (2018.01)
*G06F 9/451* (2018.01)

(52) U.S. Cl.
CPC .................................. *G06F 9/451* (2018.02)

(58) Field of Classification Search
CPC ...... G06F 9/451; G06F 16/957; G06F 16/958; G06F 8/38; G06F 16/9574; G06F 16/972; Y02D 10/00
(Continued)

(56) References Cited

U.S. PATENT DOCUMENTS 9,483,449 B1 11/2016 Wood et al.
2010/0281402 A1* 11/2010 Staikos ................. G06F 16/957 715/760
(Continued)

FOREIGN PATENT DOCUMENTS

CN 102510377 A 6/2012
CN 111552473 A 8/2020
(Continued)

OTHER PUBLICATIONS

The World Intellectual Property Organization (WIPO) International Search Report for PCT/CN2022/135213 Jan. 20, 2023 12 Pages (including translation).

*Primary Examiner* — Timothy A Mudrick
(74) *Attorney, Agent, or Firm* — Anova Law Group, PLLC

(57) ABSTRACT

A data processing method includes: acquiring, in response to an opening request for a target application page, a first component compilation file of an instant display component depending on the target application page, and acquiring a second component compilation file of a placeholder component, the placeholder component being configured to hold a place for a time-use display component of the target application page; rendering and displaying the target application page based on the first component compilation file and the second component compilation file, the rendered-displayed target application page containing the instant display component and the placeholder component; and asynchronously replacing the placeholder component in the
(Continued)

rendered-displayed target application page with the time-use display component according to a third component compilation file of the time-use display component. With the present disclosure, the speed of starting the target application page may be increased.

16 Claims, 10 Drawing Sheets

(58) Field of Classification Search
USPC .......................................................... 719/320
See application file for complete search history.

(56) References Cited

U.S. PATENT DOCUMENTS

| | | | | |
|---|---|---|---|---|
| 2011/0029899 | A1* | 2/2011 | Fainberg | G06F 12/0862 715/806 |
| 2014/0108909 | A1* | 4/2014 | Geelnard | G06T 1/60 715/275 |
| 2016/0205213 | A1* | 7/2016 | Kolam | H04L 65/765 709/218 |
| 2022/0253588 | A1 | 8/2022 | Sun et al. | |

FOREIGN PATENT DOCUMENTS

| | | | |
|---|---|---|---|
| CN | 112287257 | A | 1/2021 |
| CN | 113760438 | A | 12/2021 |

* cited by examiner

DATA PROCESSING METHOD, COMPUTER DEVICE, AND STORAGE MEDIUM

CROSS-REFERENCES TO RELATED APPLICATIONS

This application is a continuation application of PCT Patent Application No. PCT/CN2022/135213, filed on Nov. 30, 2022, which claims priority to Chinese Patent Application No. 202210196506.9, filed on Mar. 1, 2022, all of which is incorporated herein by reference in their entirety.

FIELD OF THE TECHNOLOGY

The present disclosure relates to the field of computer technologies and, in particular, to data processing.

BACKGROUND OF THE DISCLOSURE

With the continuous development of computer networks, various application programs are emerging, and each application program may run on a terminal device. In the process of running each application program, it will involve the display of the relevant application pages of the application program.

An application page is often composed of several page components. When an application page Y needs to be displayed, compilation files of all page components having a dependent relationship with the application page Y may be acquired simultaneously, and then the display of the application page Y is realized via the compilation files of all the page components. However, when the network speed is slow, or the data volume of the compilation files of all the page components depending on the application page Y is relatively large, a large start-up time of the application page Y is resulted, which in turn causes lag of the page display.

SUMMARY

One aspect of the present disclosure provides a data processing method executed by a computer device. The method includes: acquiring, in response to an opening request for a target application page, a first component compilation file of an instant display component depending on the target application page, and acquiring a second component compilation file of a placeholder component, the placeholder component being configured to hold a place for a time-use display component of the target application page; rendering and displaying the target application page based on the first component compilation file and the second component compilation file, the rendered-displayed target application page containing the instant display component and the placeholder component; and asynchronously replacing the placeholder component in the rendered-displayed target application page with the time-use display component according to a third component compilation file of the time-use display component.

Another aspect of the present disclosure provides a computer device. The computer device includes a memory and a processor, the memory storing computer programs that, when being executed, cause the processor to perform a data processing method. The method includes: acquiring, in response to an opening request for a target application page, a first component compilation file of an instant display component depending on the target application page, and acquiring a second component compilation file of a placeholder component, the placeholder component being configured to hold a place for a time-use display component of the target application page; rendering and displaying the target application page based on the first component compilation file and the second component compilation file, the rendered-displayed target application page containing the instant display component and the placeholder component; and asynchronously replacing the placeholder component in the rendered-displayed target application page with the time-use display component according to a third component compilation file of the time-use display component.

Another aspect of the present disclosure provides a non-transitory computer-readable storage medium storing computer programs that, when being executed, cause a processor to perform a data processing method. The method includes: acquiring, in response to an opening request for a target application page, a first component compilation file of an instant display component depending on the target application page, and acquiring a second component compilation file of a placeholder component, the placeholder component being configured to hold a place for a time-use display component of the target application page; rendering and displaying the target application page based on the first component compilation file and the second component compilation file, the rendered-displayed target application page containing the instant display component and the placeholder component; and asynchronously replacing the placeholder component in the rendered-displayed target application page with the time-use display component according to a third component compilation file of the time-use display component.

In the present disclosure, the following steps may be performed: acquiring, when a target application page needs to be displayed or in response to an opening request for the target application page, a first component compilation file of an instant display component of the target application page, and acquiring a second component compilation file of a placeholder component, the placeholder component being configured to hold a place for a time-use display component of the target application page; rendering and displaying the target application page based on the first component compilation file and the second component compilation file, the rendered-displayed target application page including the instant display component and the placeholder component; and asynchronously replacing the placeholder component in the rendered-displayed target application page with the time-use display component according to a third component compilation file of the time-use display component. It may be seen therefrom that when a target application page is rendered and displayed for the first time, an instant display component of the target application page and a placeholder component of a time-use display component are rendered and displayed firstly; and after the rendering is completed, the time-use display component may be rendered and displayed asynchronously in the target application page which is rendered and displayed for the first time, to reduce the start-up time of the target application page and improve the start-up speed of the target application page.

DESCRIPTION OF EMBODIMENTS

Figure 1:
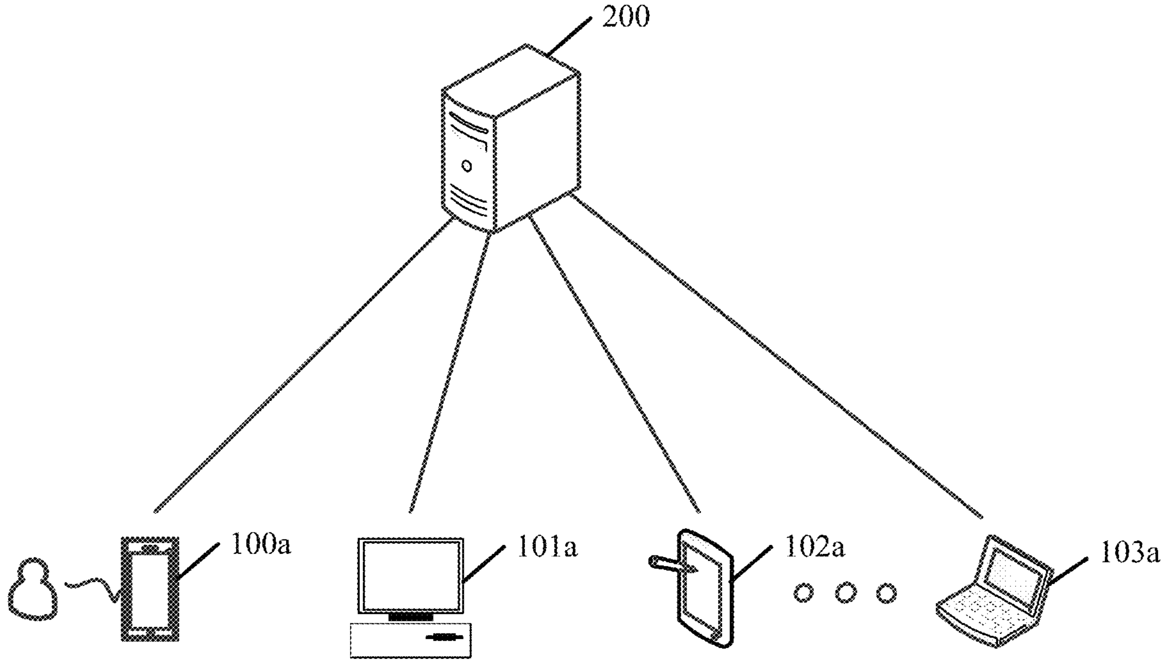
FIG. 1 illustrates a structural diagram of a network architecture according to some embodiments of the present disclosure.

The technical solutions in the present disclosure will be clearly and completely described below in conjunction with the drawings in the present disclosure. Obviously, the described embodiments are only a part of the embodiments of the present disclosure, and not all of them. All other embodiments, obtained by the ordinarily skilled in the art based on the embodiments of the present disclosure without creative efforts, shall fall within the protection scope of the present disclosure.

The present disclosure relates to cloud technology. Cloud technology refers to hosting technology for unifying a series of resources, such as hardware, software, and a network, in a wide area network or a local area network to realize the calculation, storage, processing, and sharing of data.

Cloud technology is a general term for network technology, information technology, integration technology, management platform technology, and application technology based on cloud computing business model application, which can form a resource pool, be used as needed, and be flexible and convenient. Cloud computing will become an important support. Background services of technical network systems require a large amount of computing and storage resources, such as video websites, picture websites, and portal websites. With the high development and application of the Internet industry, each item may have its own identification mark in the future, which needs to be transmitted to the background system for logical processing. The data of different levels will be processed separately. All kinds of industry data need strong system backing support, which can only be realized by cloud computing.

The cloud technology involved in the present disclosure may refer to that interaction may be performed between a front end and a background via a “cloud” to realize that the front end displays a relevant application page of an application program via relevant data pulled in the background; and the cloud technology involved in the present disclosure also refers to that a relevant compilation file (namely, a component compilation file) of a page component of an application page of an application program may be stored via the “cloud”.

For illustration purposes, it should be noted that, before collecting relevant data (such as displaying relevant request data of an application page or triggering data for a page control) and in the process of collecting the relevant data, the present disclosure can display a prompt interface or a pop-up window; the prompt interface or the pop-up window is used for prompting a user that the relevant data thereof is currently collected, so that the present disclosure only starts to perform relevant steps of acquiring relevant data after acquiring a confirmation operation sent by the user to the prompt interface or the pop-up window, otherwise (namely, when the confirmation operation sent by the user to the prompt interface or the pop-up window is not acquired) ending the relevant step of acquiring relevant data, namely, not acquiring the relevant data of the user. In other words, all the user-related data collected in the present disclosure are collected with the consent and authorization of the user, and the collection, use, and processing of relevant user data shall comply with relevant laws and regulations, and standards of relevant countries and regions.

An applet is an application that may be used without downloading and installing. In order to provide a user with a more diversified business service, a developer may develop a corresponding applet for an application (such as an instant messaging application, a shopping application, and a mail application) of a terminal; the applet may be embedded into the application of the terminal as a sub-application, and may provide the user with a corresponding business service by running the sub-application (namely, a corresponding applet) within the application.

For pages and components, the applet is composed of one or more pages, and each page is composed of one or more components. Each page and component have corresponding files such as WeiXin markup language (WXML, a set of tag languages designed by a program framework, which may construct the structure of an applet page combined with basic components and event systems), WeiXin style sheets (WXSS, a set of style languages designed by a program framework, which may set component styles and describe how various components of a page are rendered), JavaScript object notation (JSON, a lightweight data exchange format), and JavaScript (JS, a programming language). The page is a special component.

Applet compilation refers to the compilation behavior performed in the background when the applet code is uploaded, and editing the applet code according to the component level will generate a component-level file (such as a component compilation file).

On-demand injection refers to injecting only the content of the current page during page jump, including page content and the files such as dependent components or JS.

Time injection refers to injecting only the components required for the first rendering of the page based on the on-demand injection, with other components being replaced with placeholder components and asynchronously loading and injecting the placeholder components after rendering is completed.

FIG. 1 is a structural diagram of a network architecture provided by an embodiment of the present disclosure. As shown in FIG. 1, the network architecture may include a server 200 and a terminal device cluster; the terminal device cluster may include one or more terminal devices, the number of which will not be limited herein. As shown in FIG. 1, a plurality of terminal devices may specifically include a terminal device 100*a*, a terminal device 101*a*, a terminal device 102*a*, . . . , and a terminal device 103*a*. As shown in FIG. 1, the terminal device 100*a*, the terminal device 101*a*, the terminal device 102*a*, . . . , and the terminal device 103*a* may each be performed network connection with the server 200, so that each terminal device may be performed data interaction with the server 200 via the network connection.

The server 200, as shown in FIG. 1, may be an independent physical server, and may also be a server cluster or distributed system composed of a plurality of physical servers, and may further be a cloud server providing basic cloud computing services such as cloud services, cloud databases, cloud computing, cloud functions, cloud storage, network services, cloud communications, middleware services, domain name services, security services, content delivery network (CDN), as well as big data and artificial intelligence platforms. The terminal device may be an intelligent terminal such as a smartphone, a tablet, a laptop, a desktop, and a smart television. A detailed description of the embodiments of the present disclosure will be given below by taking the communication between the terminal device 100*a* and the server 200 as an example.

Figure 2:
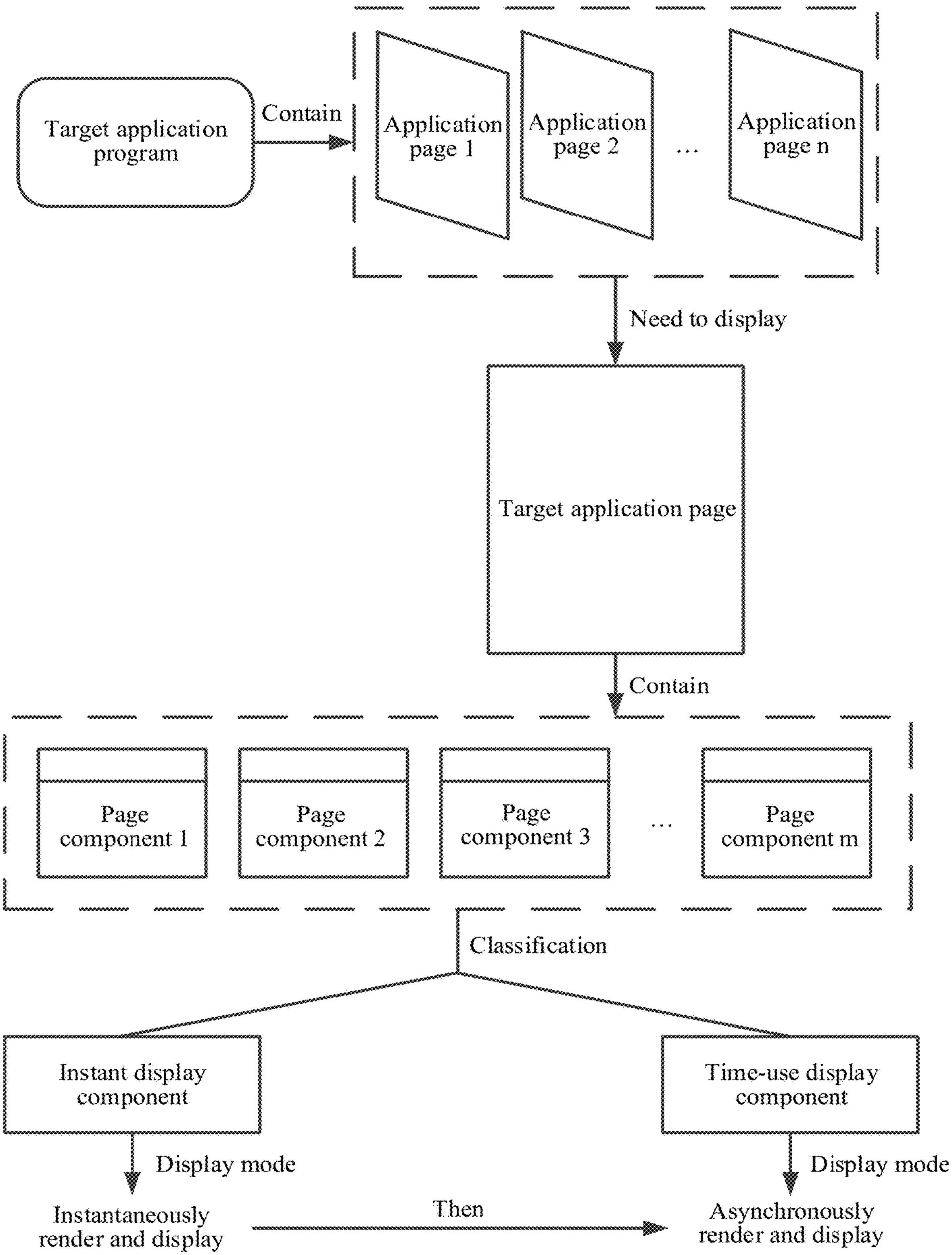
FIG. 2 illustrates a scenario diagram of a page display according to some embodiments of the present disclosure.

FIG. 2 is a scenario diagram of a page display according to some embodiments of the present disclosure. As shown in FIG. 2, the target application program may be any application program requiring page display; the target application program may be an application program in the above terminal device 100*a*; the target application program may be a subroutine of an APP, the subroutine may be an applet, and the applet may have a host program; and the above server 200 may be a background device of the host program of the applet. The target application program may contain several application pages which may be displayed; the several application pages may include application page 1 to application page n.

An application page to be displayed may be a target application page of a target application program, the target application page may be any one of the application page 1 to application page n. The target application page may contain several page components; the several page components may include page component 1 to page component m. The page component 1 to page component m may be divided into two categories, namely, instant display components and time-use display components. For example, some of the page components in the page component 1 to page component m may be instant display components, and some may be time-use display components.

The instant display components refer to page components needed to be immediately displayed on the target application page when the target application page is rendered and displayed; and the time-use display components refer to page components displayed according to a triggering operation for a page control in the target application page.

Therefore, in the present disclosure, the target application program in the terminal device 100*a* may, according to component compilation files of various page components of the target application page in the server 200, first instantaneously render and display the instant display components in the target application page, and then asynchronously render and display the time-use display components in the displayed target application page, to reduce the start-up time of the target application page and improve the display speed of the target application page. The process may also be seen in the following description of the corresponding embodiments of FIG. 3.

Figure 3:
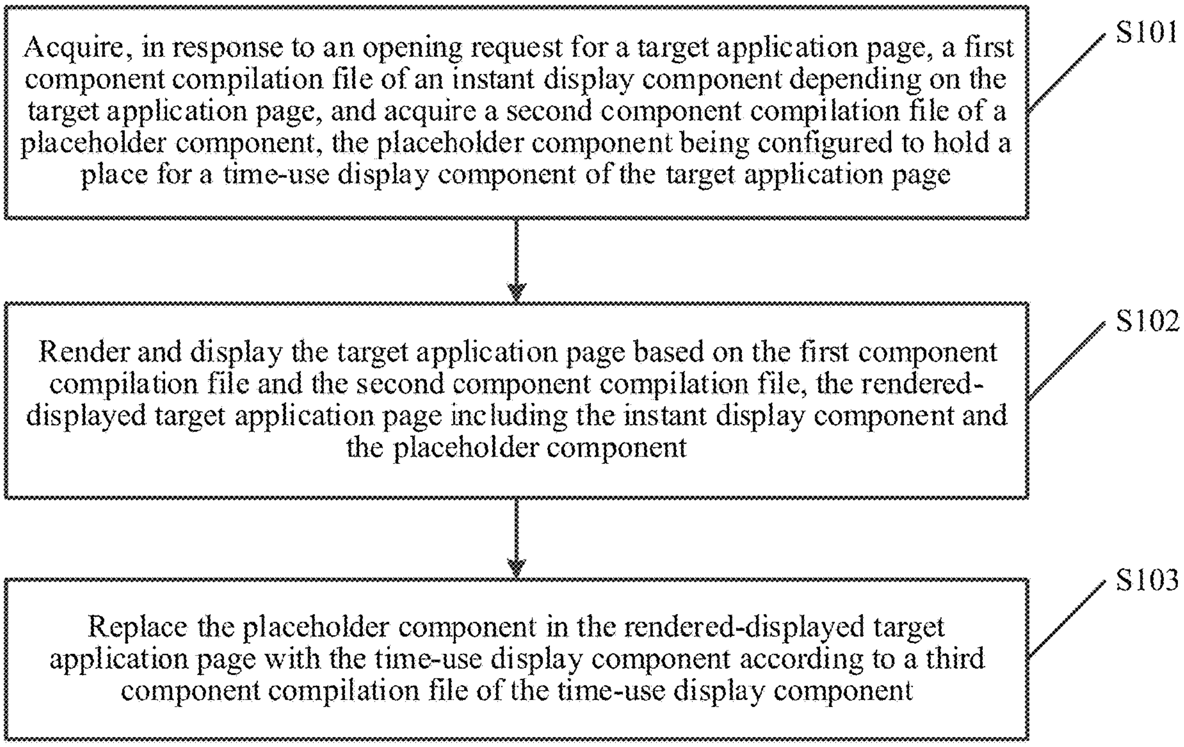
FIG. 3 illustrates a flow diagram of a data processing method according to some embodiments of the present disclosure.

FIG. 3 is a flow diagram of a data processing method according to some embodiments of the present disclosure. An execution subject in the embodiments of the present disclosure may be a computer device or a computer device cluster composed of a plurality of computer devices. The computer device may be a server or a terminal device. Therefore, the execution subject in the embodiments of the present disclosure may be a server, a terminal device, or may be composed of both the server and the terminal device. The execution subject in the present disclosure will be illustrated as the terminal device. As shown in FIG. 3, the method may include the following steps:

Step S101: Acquire, in response to an opening request for a target application page, a first component compilation file of an instant display component depending on (or otherwise associated with) the target application page, and acquire a second component compilation file of a placeholder component, the placeholder component being configured to hold a place for a time-use display component of the target application page.

The opening request is used for requesting to display a target application page, which in one embodiment may be an application page of the target application program.

In one embodiment, the terminal device may include a target application program; the target application program may be any application program requiring application page display; the target application program may be an application program in the form of an APP, or may be a subroutine (such as an applet) in the APP, or may be an application in the form of a web page. When the target application program is a subroutine, the target application program may be an applet having a host program that is the APP in which the applet resides.

The target application program contains several application pages which may be displayed on the terminal interface; the target application program may run in the terminal device; and during the running of the target application program, any application page of the target application program may be requested to be displayed. In the present disclosure, since the principle of displaying each application page of the target application program is the same, taking the process of displaying the target application page as an example for detailed description herein, the target application page may be any application page of the target application program.

When a display request or a jump display request for the target application page is triggered in a running target application program, it indicates that the target application page needs to be displayed. If another application page other than the target application page in the target application program may contain a control a, the control a may be a control for requesting to display the target application page, and when the user clicks (may also be other operations such as long pressing, sliding, or voice control) the control a, it indicates that a display request or a jump display request for the target application page is triggered.

In the following, any operation performed by the terminal device may be performed by calling the target application program or the host program to which the target application program belongs (when the target application program is an applet); and conversely, the operation performed by the target application program or the host program to which the target application program belongs may also be performed by the terminal device.

More specifically, the target application page may contain several page components, each page component contained in the target application page has a dependent relationship with the target application page, and the page component having a dependent relationship with the target application page depends on the target application page. All the page components contained in the target application page may be divided into two types, namely, instant display components (there may be a plurality of components, and the specific number thereof is determined according to the actual application scenario) and time-use display components (there may be a plurality of components, and the specific number thereof is determined according to the actual application scenario).

The instant display components refer to components needed to be displayed immediately (instantaneously) when the target application page is rendered and displayed, and the time-use display components refer to components which does not need to be displayed immediately when the target application page is rendered and displayed. Specifically, the time-use display components may refer to components that displays according to a triggering operation (such as a click operation and a long press operation) for a page control in the displayed target application page; and the page control may be any control in the target application page that may trigger to display the time-use display components.

Therefore, in the present disclosure, when a target application page of a target application program needs to be displayed, a terminal device may first acquire a component compilation file of an instant display page depending on the target application page and may acquire a component compilation file of a placeholder component. The component compilation file may be referred to as a compilation file for short; the component compilation file may be obtained by compiling source codes of the page component. The component compilation file of the instant display component may be referred to as a first component compilation file, and the component compilation file of the placeholder component may be referred to as a second component compilation file.

The placeholder component refers to a component for placing a placeholder for the time-use display component of the target application page, for example, when the component compilation file of the time-use display component has not been acquired, the placeholder component may be displayed first at the display position of the time-use display component in the target application page via the acquired component compilation file of the placeholder component. The component compilation file of the placeholder component may be simpler to compile with less data than the component compilation file of the time-use display component. For example, the placeholder component may be in the form of a rotating buffer.

It should be noted that even if a component compilation file of a time-use display component has been acquired, in order to improve page display speed, a placeholder component may be firstly rendered based on a second component compilation file, and after the rendering of a target application page including the placeholder component and the instant display component is completed, the time-use display component may be rendered by the component compilation file of the time-use display component.

In one embodiment, when the target application page needs to be displayed (such as when the foregoing opening request is acquired), the applet may acquire the component identification of the instant display component, and may acquire the component identification of the time-use display component; the component identification of the instant display component may be referred to as a first component identification, and the component identification of the time-use display component may be referred to as a second component identification. Further, the applet may pull the first component compilation file of the instant display component through the first component identification, and may pull the component compilation file of the time-use display component and/or the placeholder component of the time-use display component through the second component identification. The process may be described as follows:

By acquiring the component compilation file using the corresponding relationship between the component identification of the display component and the component compilation file, the acquiring accuracy of the component compilation file may be improved.

The process of the target application program acquiring the above first component identification and second component identification may be when the target application page needs to be displayed, the target application program may acquire a page configuration file of the target application page, the page configuration file being a pre-configured file associated with the display of the target application page. In one embodiment, when the target application program is an applet, the applet may pull the page configuration file of the target application page to the background device of the host program through the host program where it is located.

After acquiring the page configuration file of the target application page, the target application program may parse the page configuration file to obtain a component identification list composed of component identifications of a full (that is, all) component depending on the target application page, and the component identification list may be referred to as a full component identification list. In other words, the full component identification list may contain component identifications of all components depending on the target application page, and one component may correspond to one component identification. Furthermore, after the target application program parses the page configuration file, a component identification list composed of component identifications of the time-use display component depending on the target application page pre-configured for the target application page may also be obtained, and the component identification list may be referred to as a time-use component identification list.

Thus, the applet may extract the second component identification of the time-use display component from the parsed time-use display component list. The applet may also remove the component identification contained in the time-use display component identification list from the parsed full component identification list to obtain a retained component identification list; the retained component identification list is a list obtained after removing the second component identification in the full component identification list. Thus, the applet may treat the component identification in the retained component identification list as a first component identification.

Figure 4:
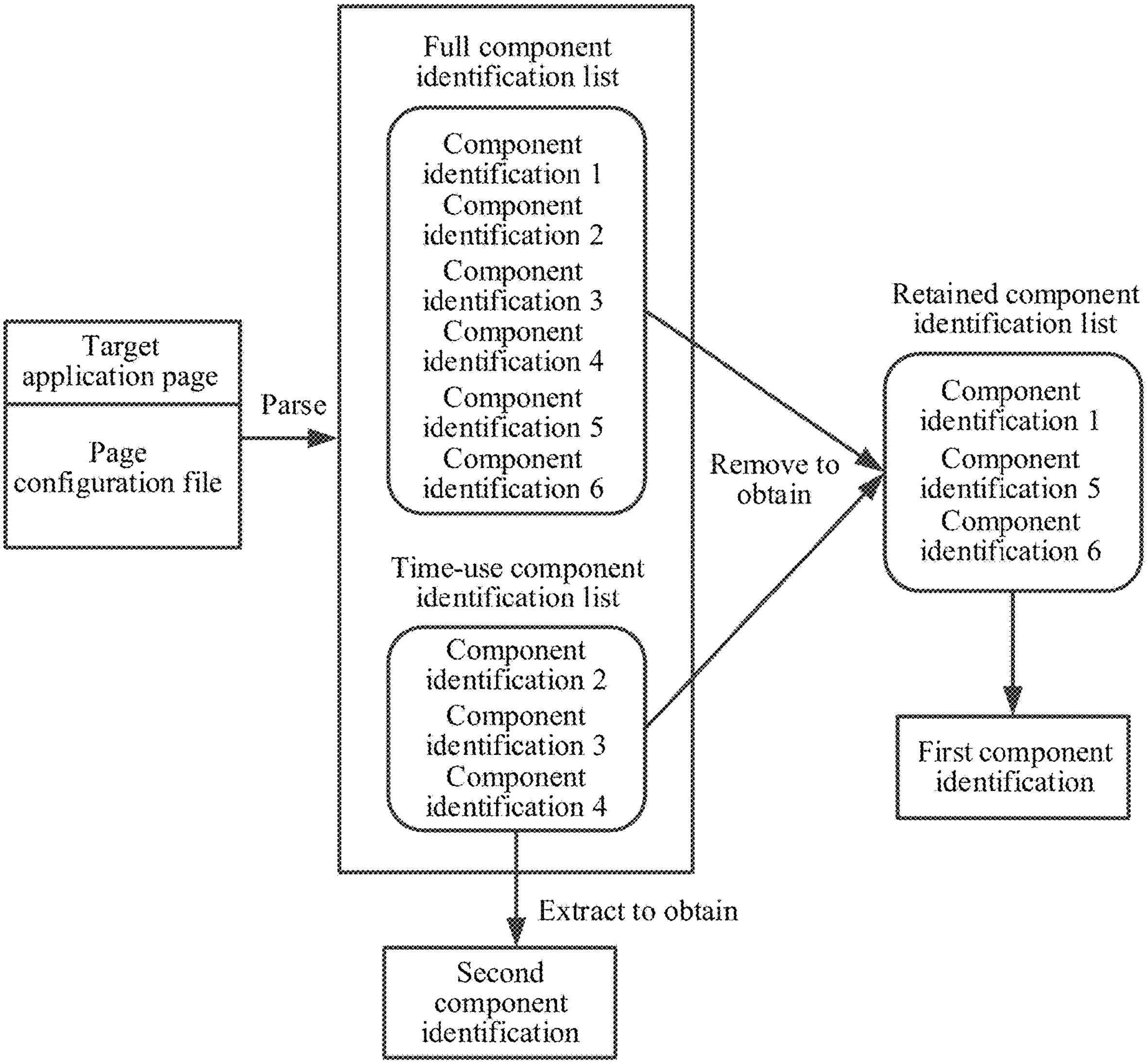
FIG. 4 illustrates a scenario diagram of acquiring component identification according to some embodiments of the present disclosure.

FIG. 4 is a scenario diagram of acquiring component identification according to some embodiments of the present disclosure. As shown in FIG. 4, a target application program may parse a page configuration file of a target application page to obtain a full component identification list and a time-use component identification list of the target application page. The full component identification list may include component identifications of various page components depending on the target application page (specifically including component identifications 1 to 6), and the time-use component identification list may include component identifications of various time-use display components depending on the target application page (specifically including component identifications 2 to 4). Therefore, the target application program may directly extract the second component identification of the time-use display component from the time-use component identification list; and there are three second component identifications, including a component identification 2, component identification 3, and component identification 4.

Furthermore, the target application program may also remove the component identification contained in the time-use component identification list in the full component identification list to obtain a retained component identification list; the retained component identification list may contain the component identification 1, the component identification 5, and the component identification 6. Therefore, the target application program may use the component identification 1, component identification 5, and component identification 6 in the retained component identification list as the first component identification of the instant display component.

The component identification contained in the above full component identification list may be understood to be an identification of an on-demand injection component of a target application page; and the component identification contained in the above time-use component identification list may be understood to be an identification of a time-use injection component of the target application page. Through the full component identification list and the time-use component identification list, the first component identification and the second component identification may be accurately determined, to avoid the misleading of component identification and improve the accuracy.

If the target application program is an applet, the process of the applet acquiring the first component compilation file of the instant display component may be as follows: The applet may generate a first file pull request; the first file pull request may refer to a request for pulling a component compilation file of an instant display component, and the first file pull request may carry a component identification of the instant display component (which may be referred to as a first component identification). Therefore, a terminal device may call a host program of the applet to pull a first component compilation file associated with the first component identification to a background device of the host program according to the first file pull request. The instant display component has an association with its first component identification.

In one embodiment, a configuration statement "lazyCodeLoading":"requiredComponents" may be added in app.json (the JSON file of the target application program), to realize the configuration of the on-demand injection component, so that the background may compile the source code of the target application program according to the component level in advance (such as compiling to obtain a component compilation file, and compiling is completed before the target application program is applied), and the loading will also be loaded according to the page level (such as loading a full component identification list of the target application page). In addition, it may be configured which injections need asynchronous injections (that is, the configuration of the time-use display component) and the corresponding placeholder components in the JSON file corresponding to the target application page.

In a scenario where a target application page of a subroutine needs to be displayed asynchronously, a first component compilation file may be acquired by a host program, thereby improving the scope of application of the present disclosure.

Further, the placeholder components may be pre-configured for time-use display components, and one time-use display component may correspond to one placeholder component. The placeholder component configured for the time-use display component may be a built-in component of the target application program (that is, several optional components pre-configured within the applet) or may be a custom component.

Therefore, if the target application program is a subroutine, the subroutine is an applet, and the placeholder component is a built-in component in the applet, the second component compilation file of the placeholder component exists inside the subroutine (namely, the applet) rather than in the background device. Therefore, the terminal device may acquire the second component compilation file of the placeholder component inside the applet (the front end) at this time. If the target application program is an applet and the placeholder component is a custom component, the applet may pull the second component compilation file of the placeholder component to the background device of the host program to which the applet belongs. The process may be as follows: The terminal device may generate a second file pull request in the applet; the second file pull request is a request for pulling a component compilation file of a placeholder component of the time-use display component, and the second file pull request may carry a component identification (which may be referred to as a second component identification) of the time-use display component. Therefore, the terminal device may call the host program to pull the second component compilation file of the placeholder component indicated by (or associated with) the second component identification to the background device of the host program according to the second file pull request. When the placeholder component is configured for the time-use display component, an association relationship between the placeholder component and the second component identification of the time-use display component may also be established.

In one embodiment, the above target application program may be an applet, the applet may have a host program, and the applet may contain a plurality of application pages (the specific number of the application pages may be determined according to an actual application scenario, which is not limited); the plurality of application pages may contain the above target application pages, the plurality of application pages may have a component set, and the component set may contain all the components (all the page components) depending on the plurality of application pages; a background device (which may be a server or a server cluster) of a host program may compile a component compilation file corresponding to each component in the component set according to units of the components, one component corresponding to one component compilation file. In other words, the background device of the host program may pre-compile component compilation files corresponding to all the page components of each application page depending on the target application page in units of components, rather than compile them in units of data packets (one data packet may contain source codes of each page component depending on several application pages), so that the front end (such as a terminal device) only needs to acquire the compilation files of the page components related to the application page needed to be displayed, instead of acquiring the compilation files of other page components related to the application page which do not need to be displayed currently, thereby reducing the acquisition amount of the data, and further reducing the page startup (display) time.

Step S102: Render and display the target application page based on the first component compilation file and the second component compilation file, the rendered-displayed target application page including the instant display component and the placeholder component.

In one embodiment, the target application program in the terminal device may render and display the target application page based on the first compilation file and the second compilation file; the first compilation file compiles (or indicates) the way to render and display the instant display component on the target application page, and the second compilation file compiles the way to render and display the placeholder component on the target application page. Therefore, the rendered instant display component and the placeholder component of the time-use display component may be contained in the rendered-displayed target application page.

Namely, the target application program in the terminal device may display a rendered target application page containing an instant display component and a placeholder component on a terminal interface.

Step S103: Asynchronously acquire a third component compilation file of the time-use display component, and replace the placeholder component in the rendered-displayed target application page with the time-use display component according to the third component compilation file.

In one embodiment, after the target application page is rendered and displayed, the applet in the terminal device may then asynchronously acquire a component compilation file of the time-use display component, and the component compilation file of the time-use display component may be referred to as a third component compilation file; the applet may replace the placeholder component in the above rendered-displayed target application page with the time-use display component according to the third component compilation file; and after the replacement, it is the finally displayed target application page, the target application page including the rendered instant display component and the time-use display component.

In one embodiment, if the target application program is an applet, the process of the applet acquiring the third component compilation file of the time-use display component may be as follows: The applet may generate a third file pull request; the third file pull request may refer to a request for pulling a component compilation file of a time-use display component, and the third file pull request may carry a component identification of the time-use display component (namely, a second component identification). Therefore, a terminal device may call a host program of the applet to pull a third component compilation file associated with the second component identification to a background device of the host program according to the third file pull request. The time-use display component has an association with its own second component identification.

Figure 5:
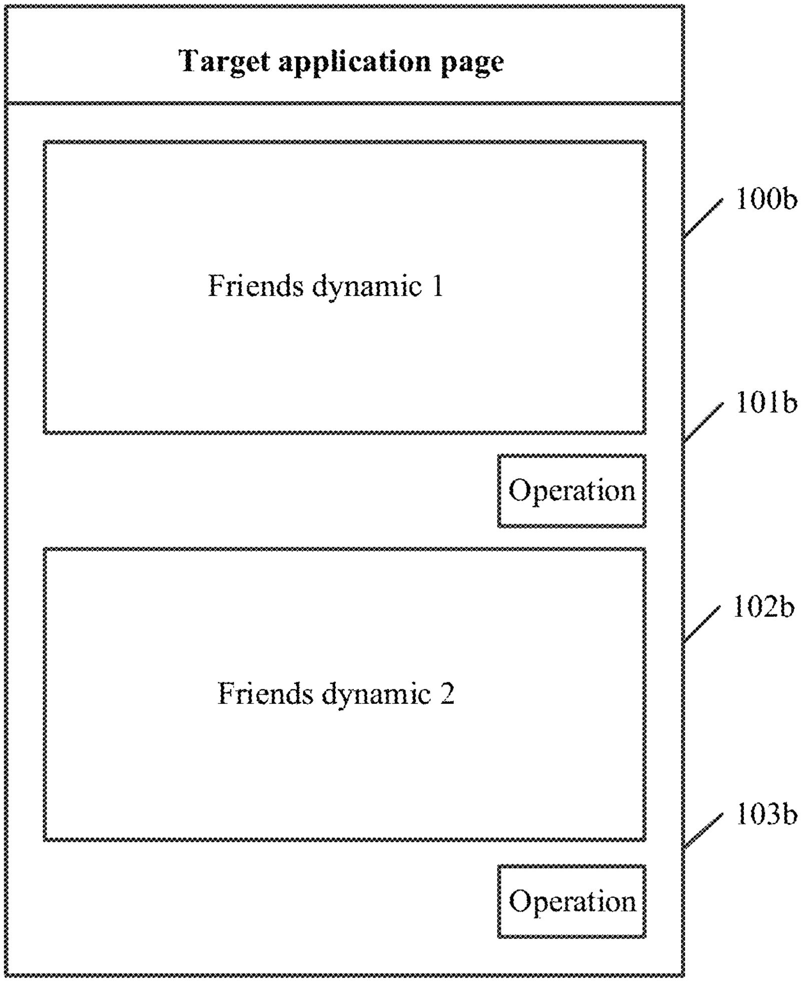
FIG. 5 to FIG. 7 illustrate page diagrams of a target application page according to some embodiments of the present disclosure.
Figure 6:
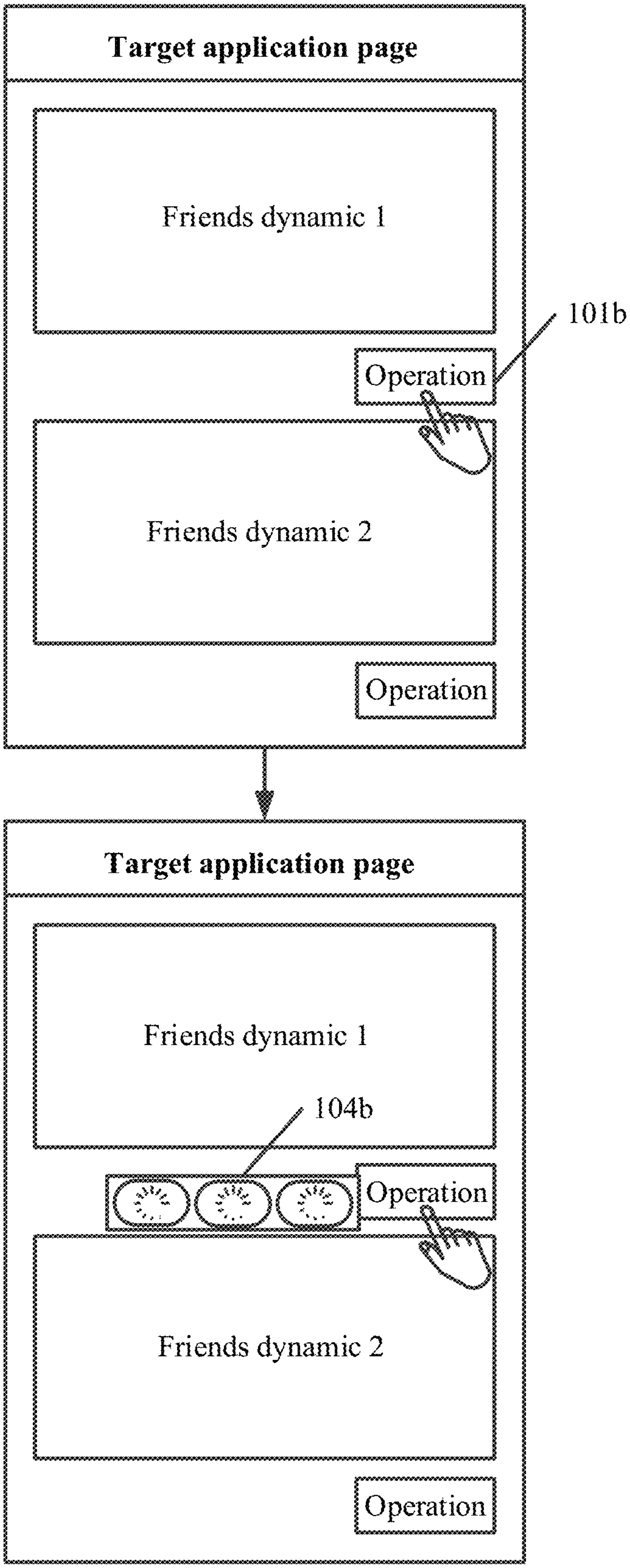
Figure 7:
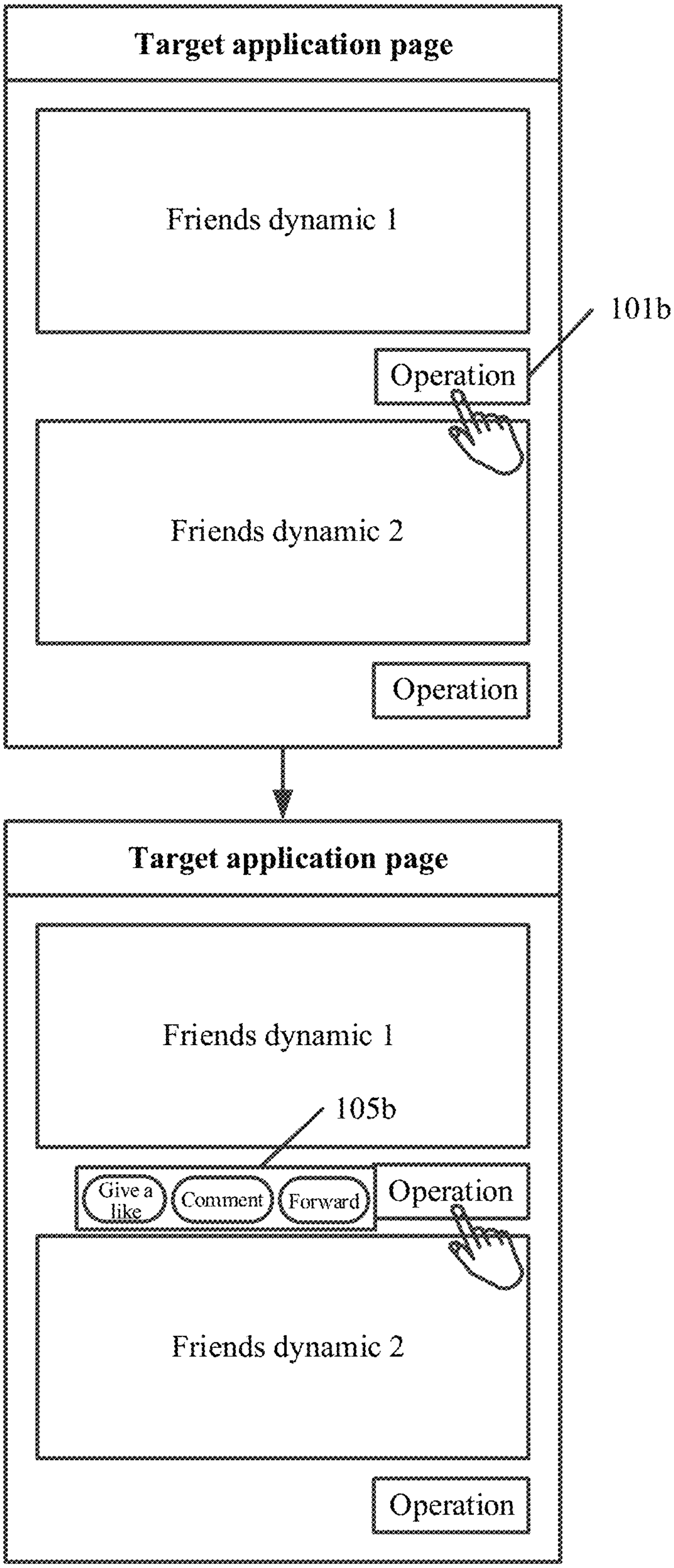

FIG. 5 to FIG. 7 are page diagrams of a target application page according to some embodiments of the present disclosure. The target application page displayed in FIG. 5 is rendered and displayed based on a component compilation file of an instant display component, the target application page containing the displayed instant display component; the instant display component may specifically include a page component 100*b*, a page component 101*b* (the page component 101*b* is a page control), a page component 102*b*, and a page component 103*b*.

Further, upon detecting a triggering operation for the page control 101*b* in the target application page displayed in FIG. 5, the target application page shown in FIG. 6 may be displayed; the target application page includes the placeholder component 104*b* of the time-use display component displayed in the target application page when the third component compilation file has not been acquired. When the target application program acquires the third component compilation file of the time-use display component, the placeholder component shown in the above FIG. 5 or FIG. 6 may be replaced with the time-use display component via the third component compilation file. At this time, the target application page may be as shown in FIG. 7; a time-use display component 105*b* replacing the placeholder component is shown in FIG. 7, and the placeholder component of the time-use display component 105*b* is the above placeholder component 104*b*. The time-use display component may further contain three controls; the three controls may include a liked control, a comment control, and a forwarded control.

By using the method provided in the present disclosure, page components in an application page are divided into two types, namely, an instant display component and a time-use display component. When the application page is rendered and displayed, the instant display component and a placeholder component of the time-use display component may be rendered and displayed on the application page first; and then a target application page rendered and displayed for the first time may be quickly presented and displayed on a terminal interface, to reduce the start-up time of the target application page; the target application page contains the instant display component and the placeholder component of the time-use display component. The compilation file of the time-use display component may be asynchronously obtained again; the target application page will be rendered for the second time; and the placeholder component included in the first rendering of the target application page is replaced to display as the time-use display component again. The data volume of the compilation file of the time-use display component is largely greater than the data volume of the placeholder component thereof, and the parsing difficulty of the compilation file of the time-use display component (rendering and displaying a corresponding component by parsing the compilation file) is also largely greater than the parsing difficulty of the placeholder component thereof. Therefore, the present disclosure, by displaying the placeholder component of the time-use display component first, and then displaying the time-use display component asynchronously, may improve the display speed of the target application page, reduce the situation of the page being stuck, and improve the user experience.

In one embodiment, the above process may belong to an application process of the target application program. In addition, the developer tool side also provides a placeholder component debugging switch (which may exist in a debugging control or a debugging tool of the placeholder component). In the development and debugging process of the above target application program (the implementation of the process is actually the same as the above application process of the target application program), if the placeholder component debugging switch is turned on, after the application page is rendered and displayed for the first time, if a component compilation file of a time-use injection component (namely, a time-use display component) is acquired, and requesting to inject a time-use injection component in the application page (for example, replacing the placeholder component with a time-use injection component) will be stopped (that is, suspending injection, which may be understood as blocking the interface for injecting the time-use display component), to facilitate developers to debug the customized placeholder component of the time-use injection component. It will be appreciated that when the placeholder component debugging switch is turned off, the target application program may normally replace the placeholder component in the firstly rendered-displayed application page with the corresponding time-use display component.

Figure 8:
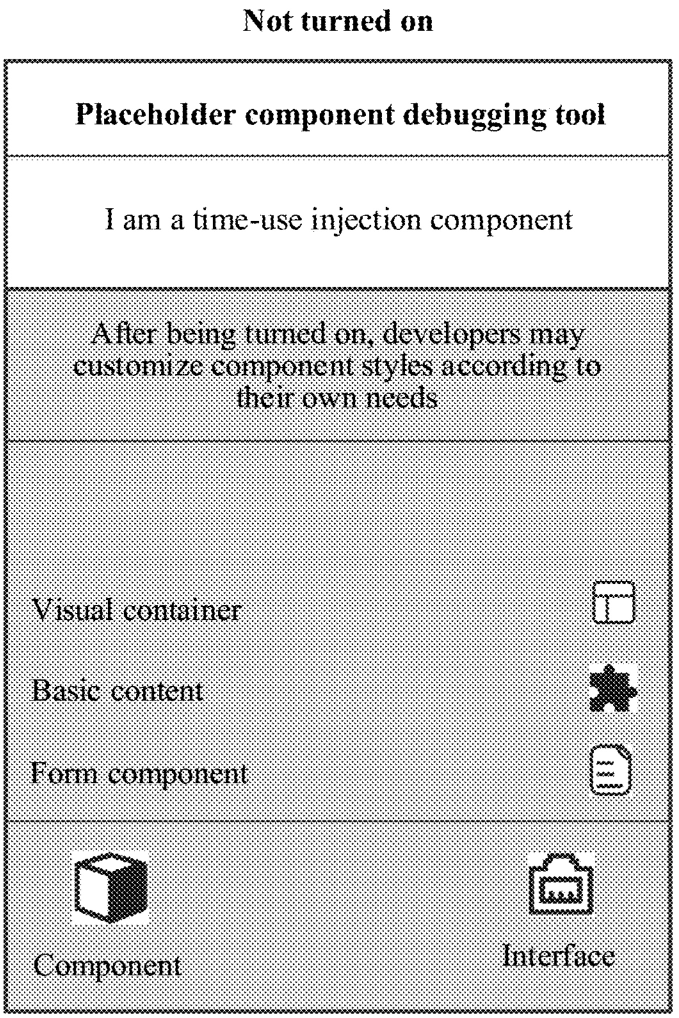
FIG. 8 and FIG. 9 illustrate page diagrams of a component debugging page according to some embodiments of the present disclosure.
Figure 9:
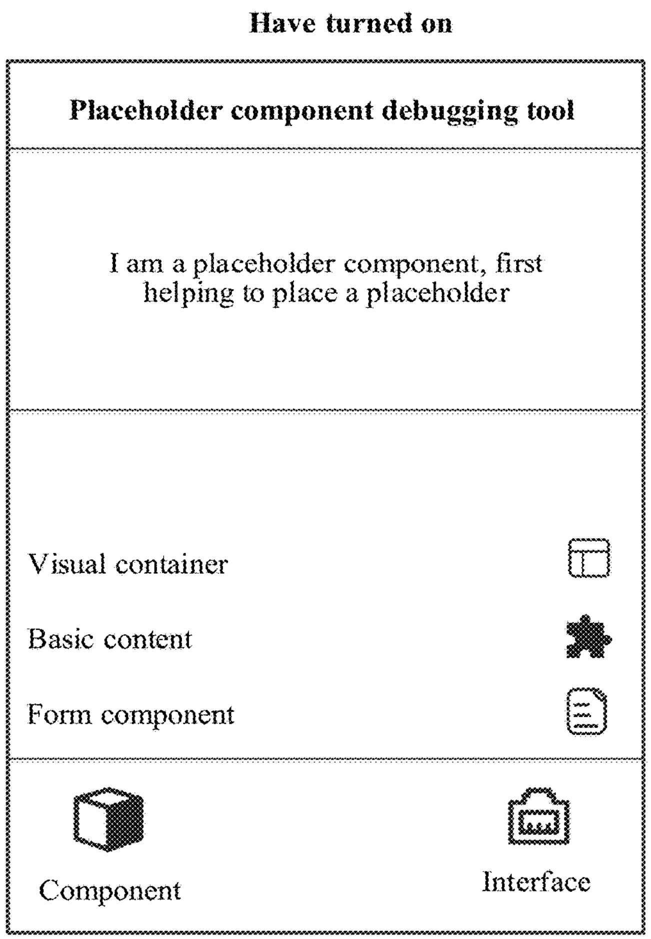

FIG. 8 and FIG. 9 are page diagrams of a component debugging page according to some embodiments of the present disclosure. As shown in FIG. 8, the page shown in FIG. 8 (which may be a page in a developer tool) refers to a state when a placeholder component debugging switch in a placeholder component debugging tool is closed; at this time, the process of the time-use injection component injecting into the target application page is normal and cannot be blocked. The page shown in FIG. 9 refers to a state when a placeholder component debugging switch in a placeholder component debugging tool is turned on; and at this moment, the placeholder component always exists in a target application page rendered for the first time, and is not replaced with a corresponding time-use injection component (namely, a time-use display component). Corresponding debugging may be performed on the currently displayed placeholder component through modules such as a visual container, basic content, and a form component in the page shown in FIG. 9, and the debugging content may be specifically determined according to an actual application scenario.

In one embodiment, the target application program may be a subroutine, and the subroutine may be an applet. The applet may have both a webview side (which may be referred to as an interface side) and an appservice side (which may be referred to as a service side). Namely, the applet is divided into two threads, webview and appservice; webview is mainly used for presenting a rendering interface (namely, a page); and appservice is used for processing business logic, data, and interface calls, realizing communication via a system layer JSBridge (bridging), and realizing the rendering of a user interface (UI) and the processing of events.

In the present disclosure, after compiling the source code of the target application program according to the granularity of the components (before applying the target application program), a common file and a file corresponding to each component/page may be generated. The compiled file directory structure may generally include app-config.json (global configuration), common.app.js (common code on two sides, possibly empty), appservice.app.js (common code on appservice side), webview.app.js (common code on webview side), path/to/a/component.common.js (specific component code shared on two sides), path/to/a/component.appservice.js (specific component code on appservice side), path/to/a/component.webview.js (specific component code on webview side), and path/to/a/page.html (page identification file (empty file) representing that the custom component is the application page).

The process of the present disclosure is described in conjunction with two sides of the target application program (if applet) mentioned above. When a user starts an applet and starts a page/jumps to a certain page in the applet, a client of a target application program (a front-end client in an application process of the target application program)/a developer tool (a programming tool in a developer device in a development process of the target application program, which may be understood to be the target application program in the development process) receives routing information (used for indicating which application page needs to be displayed currently) transmitted by a base library (a program running framework of the applet, having a framework capability and a mechanical capability), and acquires page configuration information about an application page needed to be displayed according to the routing information, injects common files (compilation files) such as common.js (common files on two sides) and webview.js (unique files on webview side) to the webview side through the page configuration information, and injects common files such as common.js (common files on two sides) and appservice.js (unique files on appservice side) to the appservice side.

Furthermore, the base library may also analyze the dependent relationship between a page and a component via the above acquired page configuration information, and may obtain a time-use injection component list (such as the above time-use component identification list) and an on-demand injection component list (such as the above full component identification list) via the analyzed dependent relationship, and acquire a pre-configured placeholder component of a time-use display component.

Then, the base library may inject, calling a loadJsFiles/loadComponents method provided by the client/developer tool on the webview side and the app service side (a method for dynamically loading resources), an on-demand injection list required by the rendering of an application page to be displayed to the two sides, and perform first rendering on the application page, the first rendered application page including an instant display component and a placeholder component of a time-use injection component. After the page loading and rendering are completed, the base library may again call the loadJsFiles/loadComponents method provided by the client/developer tool of the target application program on two sides of webview and appservice to inject a time-use injection component list into the two sides; and after the injection is completed, the base library acquires the time-use injection component (for example, acquiring a component compilation file of the time-use injection component) to replace the corresponding placeholder component in the rendered-displayed application page.

In the present disclosure, the following steps may be performed: acquiring, when a target application page of the target application program needs to be displayed, a first component compilation file of an instant display component of the target application page, and acquiring a second component compilation file of a placeholder component, the placeholder component being configured to hold a place for a time-use display component of the target application page; rendering and displaying the target application page based on the first component compilation file and the second component compilation file, the rendered-displayed target application page including the instant display component and the placeholder component; and asynchronously acquiring a third component compilation file of the time-use display component, and replacing the placeholder component in the rendered-displayed target application page with the time-use display component according to the third component compilation file. It may be seen therefrom that in the method according to some embodiments of the present disclosure, when a target application page is rendered and displayed for the first time, an instant display component of the target application page and a placeholder component of a time-use display component are rendered and displayed firstly; and after the rendering is completed, the time-use display component may be rendered and displayed asynchronously in the target application page which is rendered and displayed for the first time, to reduce the start-up time of the target application page and improve the start-up speed of the target application page.

Figure 10:
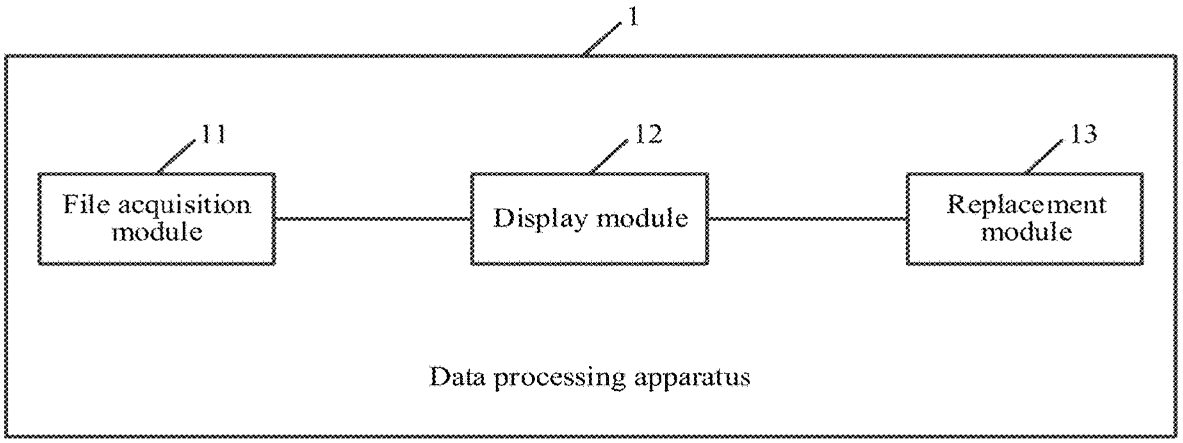
FIG. 10 illustrates a structural diagram of a data processing apparatus according to some embodiments of the present disclosure.

FIG. 10 is a structural diagram of a data processing apparatus according to some embodiments of the present disclosure. The data processing apparatus may be a computer program (including program code) running on a computer device, for example, the data processing apparatus is an application software. The data processing apparatus may be used for performing the corresponding steps in the method provided by the embodiments of the present disclosure. As shown in FIG. 10, the data processing apparatus 1 may include:

- a file acquisition module 11, configured to acquire, in response to an opening request for a target application page, a first component compilation file of an instant display component depending on the target application page, and acquire a second component compilation file of a placeholder component, the placeholder component being configured to hold a place for a time-use display component of the target application page;
- a display module 12, configured to render and display the target application page based on the first component compilation file and the second component compilation file, the rendered-displayed target application page including the instant display component and the placeholder component; and
- a replacement module 13, configured to asynchronously replace the placeholder component in the rendered-displayed target application page with the time-use display component according to a third component compilation file of the time-use display component.

In one embodiment, the file acquisition module 11 is further configured to:

- acquire a first component identification of the instant display component and acquire a second component identification of the time-use display component; and
- acquire the first component compilation file of the instant display component according to the first component identification and acquire the second component compilation file of the placeholder component according to the second component identification.

In one embodiment, the file acquisition module 11 is further configured to:

- acquire a page configuration file of the target application page;
- parse the page configuration file to obtain a full component identification list and a time-use component identification list of the target application page, the full component identification list including a component identification of a full component of the target application page and the time-use component identification list including a component identification of the time-use display component of the target application page; and
- determine the first component identification according to the full component identification list and the time-use component identification list, and extract the second component identification from the time-use component identification list.

In one embodiment, the file acquisition module 11 is further configured to:

- remove the second component identification contained in the time-use component identification list from the full component identification list to obtain a retained component identification list; and
- determine a component identification in the retained component identification list as the first component identification.

In one embodiment, the target application page is an application page of a target application program, the target application program belongs to a subroutine, and the subroutine contains a host program.

The file acquisition module 11 is further configured to:

- generate a first file pull request in the subroutine, the first file pull request carrying a first component identification of the instant display component; and
- call the host program to pull the first component compilation file associated with the first component identification to a background device of the host program according to the first file pull request.

In one embodiment, the target application page is an application page of a target application program, and the target application program belongs to a subroutine.

The file acquisition module 11 is further configured to:

- acquire the second component compilation file of the placeholder component within the subroutine when the placeholder component belongs to a built-in component of the subroutine.

In one embodiment, the target application page is an application page of a target application program, the target application program belongs to a subroutine, and the subroutine contains a host program.

The file acquisition module 11 is further configured to:

- generate a second file pull request in the subroutine when the placeholder component belongs to a custom component, the second file pull request carrying a second component identification of the time-use display component; and
- call the host program to pull the second component compilation file of the placeholder component indicated by the second component identification to a background device of the host program according to the second file pull request.

In one embodiment, the target application page is an application page of a target application program, the target application program belongs to a subroutine, and the subroutine contains a host program.

The file acquisition module 11 is further configured to:

- generate a third file pull request in the subroutine, the third file pull request carrying a second component identification of the time-use display component; and
- call the host program to pull the third component compilation file associated with the second component identification to a background device of the host program according to the third file pull request.

In one embodiment, the target application page is an application page of a target application program, and the target application program belongs to a subroutine; the subroutine contains a host program, and the subroutine contains a plurality of application pages; the plurality of application pages contain the target application page, and the plurality of application pages have a component set; the component set contains various components depending on the plurality of application pages; and a background device of the host program compiles a component compilation file corresponding to the various components in the component set according to units of the components.

In one embodiment, the instant display component refers to a component needed to be displayed instantaneously in rendering and displaying the target application page, and the time-use display component refers to a component displayed in the target application page according to a triggering operation for a page control.

According to an embodiment of the present disclosure, the steps involved in the data processing method shown in FIG. 3 may be performed by the various modules in the data processing apparatus 1 shown in FIG. 10. For example, S101 shown in FIG. 3 may be performed by the file acquisition module 11 in FIG. 10; S102 shown in FIG. 3 may be performed by the display module 12 in FIG. 10; S103 shown in FIG. 3 may be performed by the replacement module 13 in FIG. 10.

In the present disclosure, the following steps may be performed: acquiring, when a target application page needs to be displayed, a first component compilation file of an instant display component of the target application page, and acquiring a second component compilation file of a placeholder component, the placeholder component being configured to hold a place for a time-use display component of the target application page; rendering and displaying the target application page based on the first component compilation file and the second component compilation file, the rendered-displayed target application page including the instant display component and the placeholder component; and asynchronously replacing the placeholder component in the rendered-displayed target application page with the time-use display component according to a third component compilation file of the time-use display component. It may be seen therefrom that in the method according to some embodiments of the present disclosure, when a target application page is rendered and displayed for the first time, an instant display component of the target application page and a placeholder component of a time-use display component are rendered and displayed firstly; and after the rendering is completed, the time-use display component may be rendered and displayed asynchronously in the target application page which is rendered and displayed for the first time, to reduce the start-up time of the target application page and improve the start-up speed of the target application page.

According to an embodiment of the present disclosure, various modules in the data processing apparatus 1 shown in FIG. 10 may be separately or completely combined into one or several units to constitute, or some unit (s) therein may be further divided into a plurality of functionally smaller subunits, and the same operation may be realized without affecting the realization of the technical effects of the embodiments of the present disclosure. The above modules are divided based on logical functions. In practical application, the functions of one module may also be realized by a plurality of units, or the functions of a plurality of modules may be realized by one unit. In other embodiments of the present disclosure, the data processing apparatus 1 may also include other units. In practical application, these functions may also be performed with the aid of other units, and may be performed in cooperation by a plurality of units.

According to an embodiment of the present disclosure, the data processing apparatus 1 as shown in FIG. 10 may be constructed and the data processing method of the embodiments of the present disclosure may be implemented by running a computer program (including a program code) capable of performing the steps involved in the corresponding method as shown in FIG. 3, on a general-purpose computer device such as a computer including a processing element and a storage element such as a central processing unit (CPU), a random-access memory (RAM), and a read-only memory (ROM). The computer program may be recorded, for example, on a computer-readable recording medium, loaded into the above computing device through the computer-readable recording medium, and executed therein.

Figure 11:
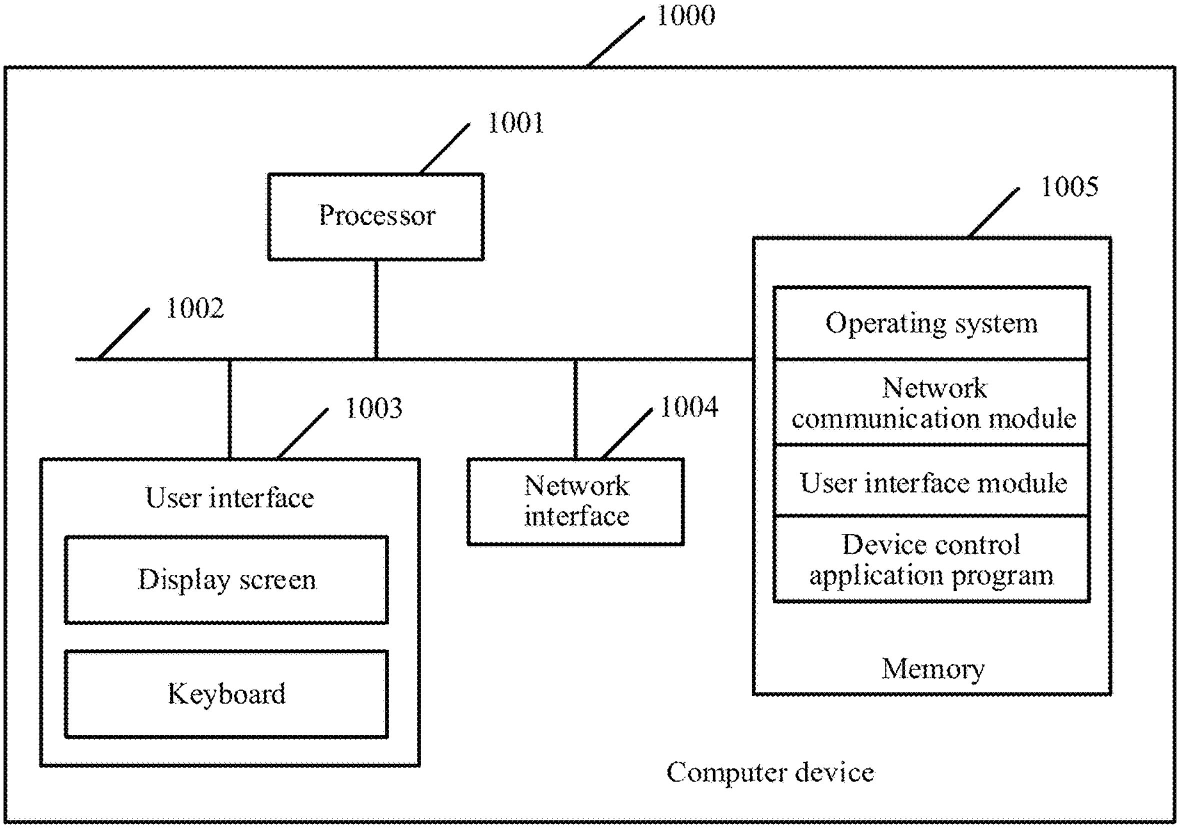
FIG. 11 illustrates a structural diagram of a computer device according to some embodiments of the present disclosure.

FIG. 11 is a structural diagram of a computer device according to some embodiments of the present disclosure. As shown in FIG. 11, the computer device 1000 may include a processor 1001, a network interface 1004, and a memory 1005. In addition, the computer device 1000 may further include a user interface 1003 and at least one communication bus 1002. The communications bus 1002 is configured to implement connection communication between these components. The user interface 1003 may include a display screen and a keyboard. In one embodiment, the user interface 1003 may also include a standard wired interface and a wireless interface. A network interface 1004 may in one embodiment include a standard wired interface and a wireless interface (for example, a WI-FI interface). The memory 1005 may be a high-speed RAM or may be a non-volatile memory, such as at least one disk memory. The memory 1005 may in one embodiment be at least one storage apparatus located remotely from the foregoing processor 1001. As shown in FIG. 11, the memory 1005, as a computer-readable storage medium, may include an operating system, a network communication module, a user interface module, and a device control application program.

In the computer device 1000 shown in FIG. 11, the network interface 1004 may provide network communication function; the user interface 1003 is mainly configured to provide an interface for a user to input; and the processor 1001 may be configured to call a device control application program stored in the memory 1005, to realize:

acquiring, in response to an opening request for a target application page, a first component compilation file of an instant display component depending on the target application page, and acquiring a second component compilation file of a placeholder component, the placeholder component being configured to hold a place for a time-use display component of the target application page;

rendering and displaying the target application page based on the first component compilation file and the second component compilation file, the rendered-displayed target application page including the instant display component and the placeholder component; and asynchronously replacing the placeholder component in the rendered-displayed target application page with the time-use display component according to a third component compilation file of the time-use display component.

The computer device 1000 described in the embodiments of the present disclosure may execute the description of the above data processing method in the embodiments corresponding to FIG. 3, and may execute the description of the above data processing apparatus 1 in the embodiments corresponding to FIG. 10, which will not be repeated herein. In addition, the description of beneficial effects of the same method are not repeated herein.

Furthermore, it is to be pointed out herein that the present disclosure further provides a computer-readable storage medium storing computer programs executed by the foregoing data processing apparatus 1, and the computer programs include program instructions; a processor, when executing the program instructions, can perform the description of the foregoing data processing method in the embodiments corresponding to FIG. 3, and therefore will not be repeated herein. In addition, the description of beneficial effects of the same method are not repeated herein. For technical details that are not disclosed in the computer-readable storage medium embodiments of the present disclosure, refer to the descriptions of the method embodiments of the present disclosure.

In an example, the above program instructions may be deployed to be executed on one computer device, or may be deployed to be executed on a plurality of computer devices located on one site, or be executed on a plurality of computer devices distributed at a plurality of sites and interconnected by a communication network, which may form a block chain network.

The above computer-readable storage medium may be a data processing apparatus provided in any one of the foregoing embodiments or an internal storage unit of the above computer device, such as a hard disk or an internal memory of the computer device. The computer-readable storage medium may also be an external storage device of the computer device, such as a plug-in hard disk, a smart media card (SMC), a secure digital (SD) card, and a flash card provided on the computer device. Further, the computer-readable storage medium may also include both an internal storage unit and an external storage device of the computer device. The computer-readable storage medium is used for storing the computer programs and other programs and data needed by the computer device. The computer-readable storage medium may also be used for temporarily storing data that has been or will be output.

The present disclosure provides a computer program product or computer program including computer instructions, the computer instructions being stored in a computer-readable storage medium. A processor of the computer device reads the computer instructions from the computer-readable storage medium; and the processor executes the computer instructions to cause the computer device to execute the description of the above data processing method in the corresponding embodiment of FIG. 3, and therefore will not be repeated herein. In addition, the description of beneficial effects of the same method are not repeated herein. For technical details that are not disclosed in the computer-readable storage medium embodiments of the present disclosure, refer to the descriptions of the method embodiments of the present disclosure.

The terms "first", "second", and the like in the specification, claims, and drawings of the embodiments of the present disclosure are used for distinguishing between different objects and not necessarily for describing a particular sequence. Furthermore, the terms "include/include" and any variations thereof, are intended to cover a non-exclusive inclusion. For example, a process, method, apparatus, product, or device containing a list of steps or units is not limited to the listed steps or modules, but may in one embodiment include steps or modules that are not listed, or may in one embodiment include additional steps or units inherent to such process, method, apparatus, product, or device.

The term module (and other similar terms such as submodule, unit, subunit, etc.) in the present disclosure may refer to a software module, a hardware module, or a combination thereof. A software module (e.g., computer program) may be developed using a computer programming language. A hardware module may be implemented using processing circuitry and/or memory. Each module can be implemented using one or more processors (or processors and memory). Likewise, a processor (or processors and memory) can be used to implement one or more modules. Moreover, each module can be part of an overall module that includes the functionalities of the module.

The ordinarily skilled in the art may appreciate that the units and algorithm steps described in connection with the embodiments disclosed herein may be implemented as electronic hardware, computer software, or combinations of both. In order to clearly illustrate the interchangeability between hardware and software, the composition and steps of the examples have been described generally by function in the above description. Whether such functions are implemented as hardware or software depends upon the application and design constraints imposed on the technical solutions. Skilled artisans may implement the described functions in varying ways for each application, but such implementations are not to be interpreted as causing a departure from the scope of the present disclosure.

Methods and related apparatus provided by the embodiments of the present disclosure are described with reference to method flowcharts and/or structural diagrams provided by the embodiments of the present disclosure; and each flow and/or block of the method flowcharts and/or structural diagrams, and combinations of flows and/or blocks in the flowcharts and/or block diagrams, may be implemented by the computer program instructions. These computer program instructions may be provided to a processor of a general-purpose computer, special-purpose computer, embedded processor, or other programmable data processing devices to produce a machine, such that the instructions, executed via the processor of the computer or other programmable data processing devices, create apparatuses for implementing the functions specified in a flow or flows of the flowcharts and/or a block or blocks of the structural diagrams. These computer program instructions may also be stored in a computer-readable memory that may direct a computer or other programmable data processing devices to function in a particular manner, such that the instructions stored in the computer-readable memory produce an article of manufacture including instruction apparatuses which implement the functions specified in the flow or flows of the flowcharts and/or block or blocks of the structural diagrams. These computer program instructions may also be loaded onto a computer or other programmable data processing devices to cause a series of operational steps to be performed on the computer or other programmable devices to produce a computer implemented process, such that the instructions, executed on the computer or other programmable devices, provide steps for implementing the functions specified in the flow or flows of the flowcharts and/or block or blocks of the structural diagrams.

The above disclosure is only a better embodiment of the present disclosure, and of course cannot be used to define the scope of the present disclosure. Therefore, equivalent changes made under the claims of the present disclosure are still covered by the present disclosure.

What is claimed is:

1. A data processing method executed by a computer device, the method comprising:

acquiring, in response to an opening request for a target application page of a target application program, a page configuration file of the target application page by calling a host program, wherein the target application program is an applet embedded in the host program;

parsing the page configuration file to obtain a full component identification list and a time-use component identification list of the target application page, the full component identification list comprising component identifications of all page components of the target application page and the time-use component identification list comprising a component identification of a time-use display component of the target application page, wherein the page components of the target application page includes two categories: an instant display component and the time-use display component;

determining a first component identification of the instant display component according to the full component identification list and the time-use component identification list, and extracting a second component identification from the time-use component identification list;

acquiring a first component compilation file of the instant display component depending on the target application page according to the first component identification, and acquiring a second component compilation file of a placeholder component according to the second component identification, the placeholder component being configured to hold a place for the time-use display component of the target application page;

rendering and displaying the target application page based on the first component compilation file and the second component compilation file, the rendered-displayed target application page containing the instant display component and the placeholder component; and asynchronously replacing the placeholder component in the rendered-displayed target application page with the time-use display component according to a third component compilation file of the time-use display component.

2. The method according to claim 1, wherein determining the first component identification according to the full component identification list and the time-use component identification list comprises:

removing the component identification in the time-use component identification list from the full component identification list to obtain a retained component identification list; and determining a component identification in the retained component identification list as the first component identification.

3. The method according to claim 1, wherein acquiring the first component compilation file of the instant display component depending on the target application page comprises:

generating a first file pull request in the applet, the first file pull request carrying a first component identification of the instant display component; and calling the host program to pull the first component compilation file associated with the first component identification to a background device of the host program according to the first file pull request.

4. The method according to claim 1, wherein acquiring the second component compilation file of the placeholder component comprises:

acquiring the second component compilation file of the placeholder component within the applet when the placeholder component belongs to a built-in component of the applet.

5. The method according to claim 1, wherein acquiring the second component compilation file of the placeholder component comprises:

generating a second file pull request in the applet when the placeholder component belongs to a custom component, the second file pull request carrying a second component identification of the time-use display component; and calling the host program to pull the second component compilation file of the placeholder component indicated by the second component identification to a background device of the host program according to the second file pull request.

6. The method according to claim 1, further comprising:

generating a third file pull request in the applet, the third file pull request carrying a second component identification of the time-use display component; and calling the host program to pull the third component compilation file associated with the second component identification to a background device of the host program according to the third file pull request.

7. The method according to claim 1, wherein the target application program contains a plurality of application pages; the target application page is one of the plurality of application pages, and the plurality of application pages have a component set; the component set contains page components depending on the plurality of application pages; and component compilation files in the component set are pre-complied by a background device of the host program respectively according to units of the components, each component compilation file corresponding to one of the page components.

8. The method according to claim 1, wherein the instant display component needs to be displayed instantaneously when the target application page is rendered, and the time-use display component is displayed in response to a triggering operation for a page control.

9. A computer device comprising a memory and a processor, the memory storing computer programs that, when being executed, cause the processor to perform:

acquiring, in response to an opening request for a target application page of a target application program, a page configuration file of the target application page by calling a host program, wherein the target application program is an applet embedded in the host program;

parsing the page configuration file to obtain a full component identification list and a time-use component identification list of the target application page, the full component identification list comprising component identifications of all page components of the target application page and the time-use component identification list comprising a component identification of a time-use display component of the target application page, wherein the page components of the target application page includes two categories: an instant display component and the time-use display component;

determining a first component identification of the instant display component according to the full component identification list and the time-use component identification list, and extracting a second component identification from the time-use component identification list;

acquiring a first component compilation file of the instant display component depending on the target application page according to the first component identification, and acquiring a second component compilation file of a placeholder component according to the second component identification, the placeholder component being configured to hold a place for the time-use display component of the target application page;

rendering and displaying the target application page based on the first component compilation file and the second component compilation file, the rendered-displayed target application page containing the instant display component and the placeholder component; and asynchronously replacing the placeholder component in the rendered-displayed target application page with the time-use display component according to a third component compilation file of the time-use display component.

10. The computer device according to claim 9, wherein determining the first component identification according to the full component identification list and the time-use component identification list comprises:

removing the component identification in the time-use component identification list from the full component identification list to obtain a retained component identification list; and determining a component identification in the retained component identification list as the first component identification.

11. The computer device according to claim 9, wherein acquiring the first component compilation file of the instant display component depending on the target application page comprises:

generating a first file pull request in the applet, the first file pull request carrying a first component identification of the instant display component; and calling the host program to pull the first component compilation file associated with the first component identification to a background device of the host program according to the first file pull request.

12. The computer device according to claim 9, wherein acquiring the second component compilation file of the placeholder component comprises:

acquiring the second component compilation file of the placeholder component within the applet when the placeholder component belongs to a built-in component of the applet.

13. The computer device according to claim 9, wherein acquiring the second component compilation file of the placeholder component comprises:

generating a second file pull request in the applet when the placeholder component belongs to a custom component, the second file pull request carrying a second component identification of the time-use display component; and calling the host program to pull the second component compilation file of the placeholder component indicated by the second component identification to a background device of the host program according to the second file pull request.

14. The computer device according to claim 9, wherein the processor is further configured to perform:

generating a third file pull request in the applet, the third file pull request carrying a second component identification of the time-use display component; and calling the host program to pull the third component compilation file associated with the second component identification to a background device of the host program according to the third file pull request.

15. The computer device according to claim 9, wherein the target application program contains a plurality of application pages; the target application page is one of the plurality of application pages, and the plurality of application pages have a component set; the component set contains page components depending on the plurality of application pages; and component compilation files in the component set are pre-complied by a background device of the host program respectively according to units of the components, each component compilation file corresponding to one of the page components.

16. A non-transitory computer-readable storage medium storing computer programs, wherein the computer programs, when being executed, cause a processor to perform:

acquiring, in response to an opening request for a target application page of a target application program, a page configuration file of the target application page by calling a host program, wherein the target application program is an applet embedded in the host program;

parsing the page configuration file to obtain a full component identification list and a time-use component identification list of the target application page, the full component identification list comprising component identifications of all page components of the target application page and the time-use component identification list comprising a component identification of a time-use display component of the target application page, wherein the page components of the target application page includes two categories: an instant display component and the time-use display component;

determining a first component identification of the instant display component according to the full component identification list and the time-use component identification list, and extracting a second component identification from the time-use component identification list;

acquiring a first component compilation file of the instant display component depending on the target application page according to the first component identification, and acquiring a second component compilation file of a placeholder component according to the second component identification, the placeholder component being configured to hold a place for the time-use display component of the target application page;

rendering and displaying the target application page based on the first component compilation file and the second component compilation file, the rendered-displayed target application page containing the instant display component and the placeholder component; and asynchronously replacing the placeholder component in the rendered-displayed target application page with the time-use display component according to a third component compilation file of the time-use display component.

* * * * *